United States Patent [19]

Fujita

[11] Patent Number: 5,138,592
[45] Date of Patent: Aug. 11, 1992

[54] OPTICAL READ/WRITE APPARATUS WITH IMPROVED TRACKING PERFORMANCE

[75] Inventor: Teruo Fujita, Nagaokakyo, Japan

[73] Assignee: Mitsubishi Denki Kabushiki Kaisha, Tokyo, Japan

[21] Appl. No.: 577,769

[22] Filed: Sep. 5, 1990

[30] Foreign Application Priority Data

Sep. 14, 1989 [JP] Japan ................................ 1-236991

[51] Int. Cl.⁵ .............................................. G11B 7/00
[52] U.S. Cl. .................. 369/44.13; 369/122; 369/119; 369/44.37
[58] Field of Search ............... 369/112, 121, 122, 119, 369/117, 118, 92, 95, 44.17, 44.18, 44.37, 44.38, 44.13, 44.21, 44.22

[56] References Cited

U.S. PATENT DOCUMENTS

| | | | |
|---|---|---|---|
| 4,462,095 | 7/1984 | Chen | 369/44.13 |
| 4,656,618 | 4/1987 | Kaku et al. | 369/112 |
| 4,935,913 | 6/1990 | Shinoda | 369/44.11 |

FOREIGN PATENT DOCUMENTS

| | | |
|---|---|---|
| 3323007 | 6/1984 | Fed. Rep. of Germany . |
| 3641587 | 6/1987 | Fed. Rep. of Germany . |

OTHER PUBLICATIONS

"Principles of Optical Disc Systems," Bouwhuis et al., Adam Hilger Ltd., 1985.

Primary Examiner—Roy N. Envall, Jr.
Assistant Examiner—Nabil Hindi

[57] ABSTRACT

An optical read/write apparatus includes an optical device for directing a main scanning spot and a pair of satellite spots, one on either side of the main scanning spot, onto a recording. It further includes a wobbling device for moving the satellite spots in relation to the main scanning spot. The satellite spots are moved with an oscillatory motion in a direction perpendicular to tracks on the recording medium. A tracking control device detects light reflected from the satellite spots, generates a tracking error signal, and moves the main scanning spot according to the tracking error signal in a direction perpendicular to the. This keeps the main scanning spot accurately centered on a track without offset and without wobbling the main scanning spot.

18 Claims, 12 Drawing Sheets

OPTICAL READ/WRITE APPARATUS WITH IMPROVED TRACKING PERFORMANCE

BACKGROUND OF THE INVENTION

This invention relates to an optical read/write apparatus, more particularly to an optical read/write apparatus with improved tracking performance.

In an optical read/write apparatus, a light beam from a light source such as a laser diode is focused by an objective lens onto a spot on an information track on a recording medium such as an optical disk. In write mode, information is recorded on the track by, for example, modulating the intensity of the beam. In read mode, information already recorded on the track is reproduced by converting the light reflected from the spot to an electrical signal. Different beams can be used for reading and writing, or the same beam can be switched between read and write modes. In both read and write modes the objective lens is moved according to tracking error and focusing error signals derived from the reflected light, to keep the spot precisely in focus and centered on the information track.

Most prior-art optical read/write apparatus uses the push-pull method of tracking control, in which light reflected from the recording medium is received by a split photodetector, the difference between the signals from the two halves of the photodetector being used as the tracking error signal. A disadvantage of this method is that it is prone to offset effects when the recording medium is tilted, or when the objective lens is moved to follow an information track. Under these conditions, a zero tracking error signal occurs not when the spot is centered on the information track, but when it is offset by a certain distance from the track center. A tilt of as little as 1°, or a tracking motion of as little as 100 μm by the objective lens, can cause an unacceptably high track offset.

An alternative method of tracking control is the radial wobbling method, in which a slight oscillatory motion is imparted to the spot, causing it to wobble in a direction perpendicular to the information tracks, and tracking is controlled by detecting the response of the reflected light to the wobble. It is known that the radial wobbling method almost completely solves the problem of track offset. Unfortunately, this method cannot be used to control tracking during both reading and writing, due to the impracticality of synchronizing the reading wobble with the writing wobble. In particular, the radial wobbling method is unsuitable for apparatus that uses a single beam for both reading and writing.

SUMMARY OF THE INVENTION

An object of the present invention is accordingly to provide tracking control without track offset.

A further object is to provide tracking control without wobbling the read/write spot.

An optical read/write apparatus has optical means for directing a main scanning spot and a pair of satellite spots, one on either side of the main scanning spot, onto a recording medium. The main scanning spot and satellite spots are disposed on a line substantially parallel to information tracks on the recording medium. A wobbling means moves the satellite spots in relation to the main scanning spot, causing the satellite spots to wobble in a direction perpendicular to the information tracks. A tracking control means detects light reflected from the satellite spots, generates therefrom a tracking error signal, and moves the main scanning spot according to the tracking error signal in a direction perpendicular to the information tracks.

DETAILED DESCRIPTION OF THE INVENTION

A novel optical read/write apparatus will be described with reference to the FIGS. 1 to 6, then modifications of the apparatus will be described with reference to FIGS. 7 to 12. The description will deal mainly with the tracking control and spot wobbling device. The mechanisms for focusing control and for reading and writing information on the recording medium will not be explicitly shown, since these mechanisms can be the same as in the prior art. Discussions of the operations of reading and writing information will be omitted.

Figure 1:
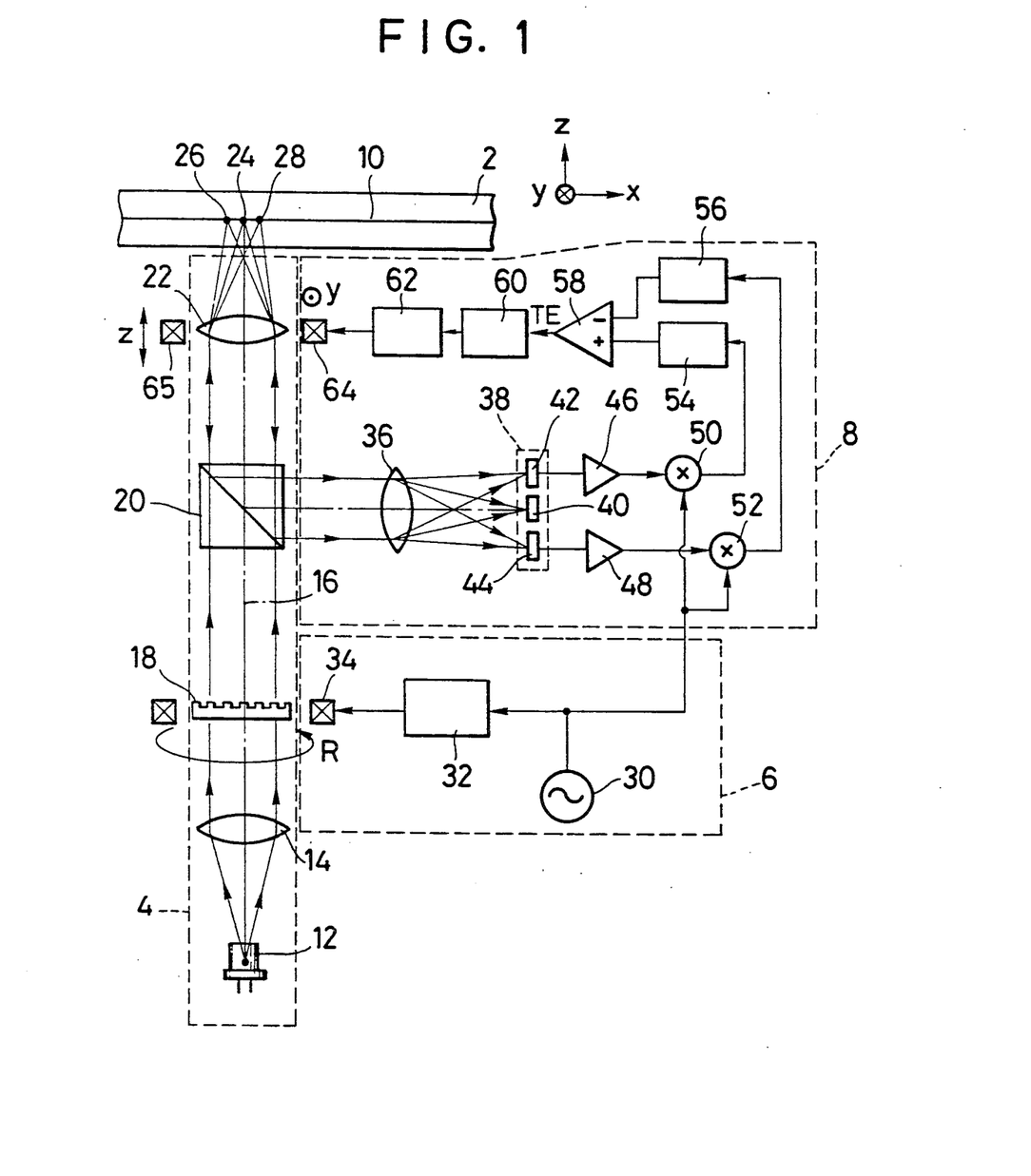
FIG. 1 shows an optical read/write apparatus embodying the present invention.

The optical read/write apparatus shown in FIG. 1 comprises a recording medium 2, an optical device 4, a wobbling device 6, and a tracking control device 8. The recording medium 2 is, for example, an optical disk comprising layers of different materials. An interface between two of the layers is pre-grooved into concentric or spiral information tracks 10 on which information can be recorded by well-known optical or thermo-magnetic methods. In FIG. 1, one information track 10 is shown extending in the x-direction (horizontally).

The optical device 2 has a light-emitting source 12 such as a laser diode for generating a light beam, and a collimator lens 14 for collimating the beam parallel to the optic axis 16, which runs in the z-direction (vertically in FIG. 1). The collimated beam is transmitted through a grating 18 which divides it into a plurality of beams diverging slightly from each other in the x-direction. The grating 18 is mounted in a plane perpendicular to the optic axis 16 and can be rotated in this plane as indicated by the arrow R.

The beams created by the grating 18 pass through a beam splitter 20 and are focused by an objective lens 22 onto the recording medium 2, creating a main scanning spot 24 and a pair of satellite spots 26 and 28. The main scanning spot is the read/write spot, for reading and writing information on the recording medium 2. The satellite spots 26 and 28 are disposed one on either side of the main scanning spot 24, the three spots lying on a line substantially parallel to the information tracks 10 on the recording medium 2.

The light focused onto the main scanning spot 24 and the satellite spots 26 and 28 is reflected from the recording medium 2 and returns through the objective lens 22 to the beam splitter 20, where it is internally reflected toward the tracking control device 8. The beam splitter 20 may be a polarizing beam splitter, in which case a quarter wave plate, not shown in the drawings, is interposed between the beam splitter 20 and the objective lens 22. Polarizing beam splitters and quarter wave plates are well known from the prior art.

The wobbling device 6 comprises an oscillator 30 for generating an oscillating signal with a frequency f, an amplifier 32 for receiving and amplifying the oscillating signal, and a rotary actuator 34 for receiving the amplified oscillating signal and rotating the grating 18 accordingly. The rotation is alternately in the direction of the arrow R and the opposite direction. As will be explained later, this rotation causes the pair of satellite spots 26 and 28 to wobble in the y-direction, perpendicular to the information tracks 10 on the recording medium 2.

The tracking control device 8 includes a focusing lens 36 for receiving the light reflected from the beam splitter 20 and focusing this light onto a photodetector array 38 comprising photodetectors 40, 42, and 44. The photodetectors 40, 42, and 44 generate current output signals representing the intensity of the incident light. The outputs of the photodetectors 42 and 44 are converted to voltage signals by a pair of current-to-voltage converters 46 and 48, then input as multiplicands to a pair of multipliers 50 and 52, which multiply them by the oscillating signal from the oscillator 30 to generate a pair of product signals. The product signals are filtered by respective low-pass filters 54 and 56, then input to a differential amplifier 58 which takes their difference, thus generating a tracking error signal TE. The cutoff frequency of the low-pass filters 54 and 56 is less than the frequency f of the oscillator 30.

The tracking error signal TE is passed through a phase compensator 60 and amplified by an amplifier 62. The amplified tracking signal TE drives a tracking actuator 64. The tracking actuator 64 is a device such as an electromagnet adapted to move the objective lens 22 in the y-direction, thus moving the main scanning spot 24 and the pair of satellite spots 26 and 28 in the y-direction, perpendicular to the information tracks 10. The purpose of this motion is to keep the main scanning spot 24 accurately centered on an information track 10.

The objective lens 22 can also be moved in the z-direction in FIG. 1 by a focusing actuator 65, for focusing control. Well-known methods of focusing control such as the knife-edge method or astigmatic method can be employed.

Figure 2A:
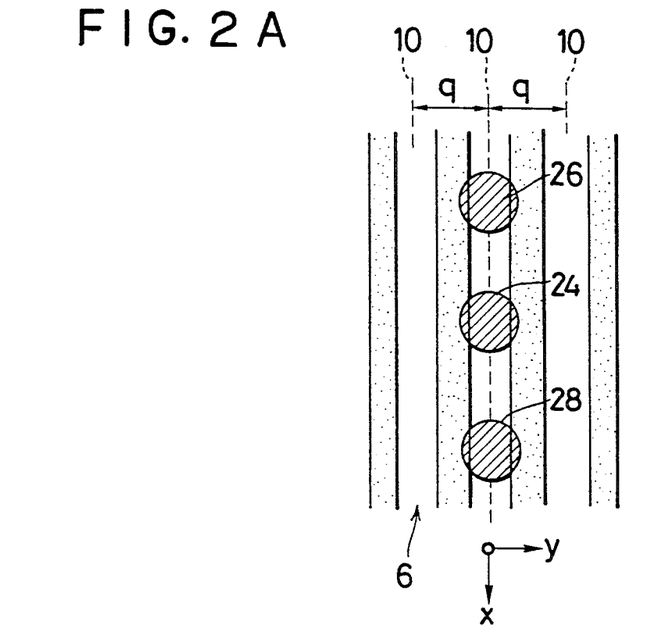
FIGS. 2A and 2B show images of the main scanning spot and satellite spots in FIG. 1.
Figure 2B:
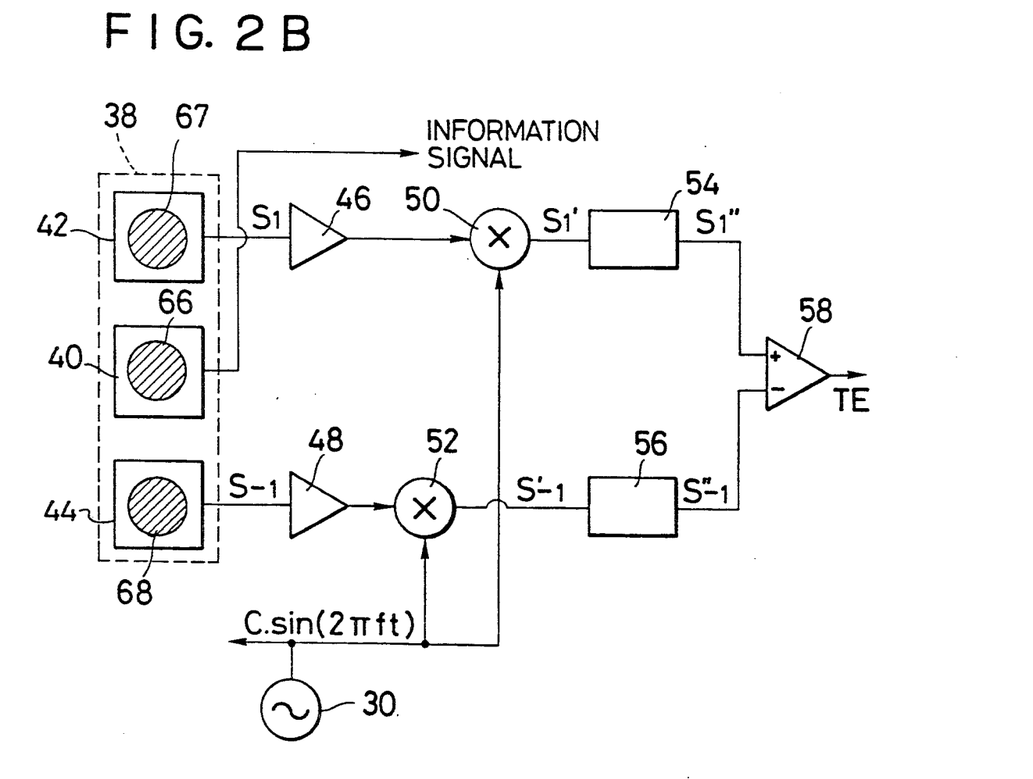

FIG. 2A shows a more detailed view of the main scanning spot 24 and the satellite spots 26 and 28 focused onto the recording medium 2 by the objective lens 22. All three spots are focused onto the same information track 10, one ahead of another. FIG. 2B shows the images of these three spots formed on the photodetector array 38 by the focusing lens 36. The light reflected from the main scanning spot 24 is focused to a spot image 66 on the photodetector 40. The output of the photodetector 40 is an information signal which is passed to signal-processing circuits not shown in the drawings, for reading information recorded on the recording medium 2. The light reflected from the satellite spots 26 and 28 is focused to spot images 67 and 68 on the photodetectors 42 and 44.

The current signals output by the photodetectors 42 and 44 are designated $s_1$ and $s_{-1}$, respectively. The oscillating signal from the oscillator 30 is a sinewave signal of the form $C \cdot \sin(2\pi ft)$, where C is a constant giving the signal amplitude, f is the frequency, and t is a variable representing time. Multiplication of $s_1$ and $s_{-1}$ by $C \cdot \sin(2\pi ft)$ yields product signals $s'_1$ and $s'_{-1}$ which are said to be synchronously detected. Specifically, $s'_1$ and $s'_{-1}$ are both synchronized to the wobbling of the pair of satellite spots 26 and 28.

Low-pass filtering of $s'_1$ and $s'_{-1}$ produces signals $s''_1$ and $s''_{-1}$. The difference between these signals, $s''_1 - s''_{-1}$, is the tracking error signal TE.

Next a more detailed description will be given of the wobbling motion imparted to the pair of satellite spots 26 and 28.

Figure 3A:
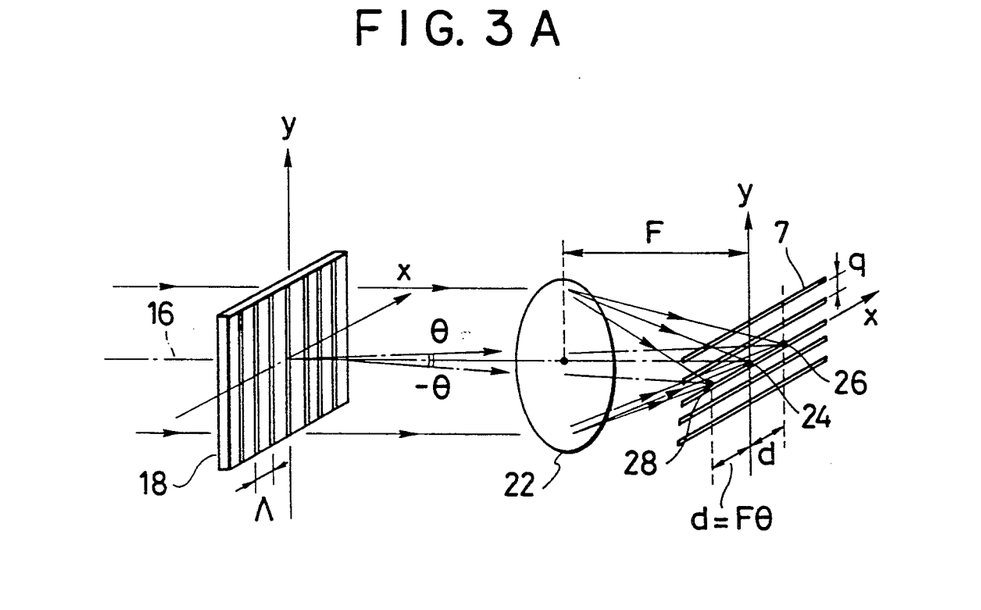
FIGS. 3A and 3B illustrate generation of the main scanning spot and satellite spots by diffraction.
Figure 3B:
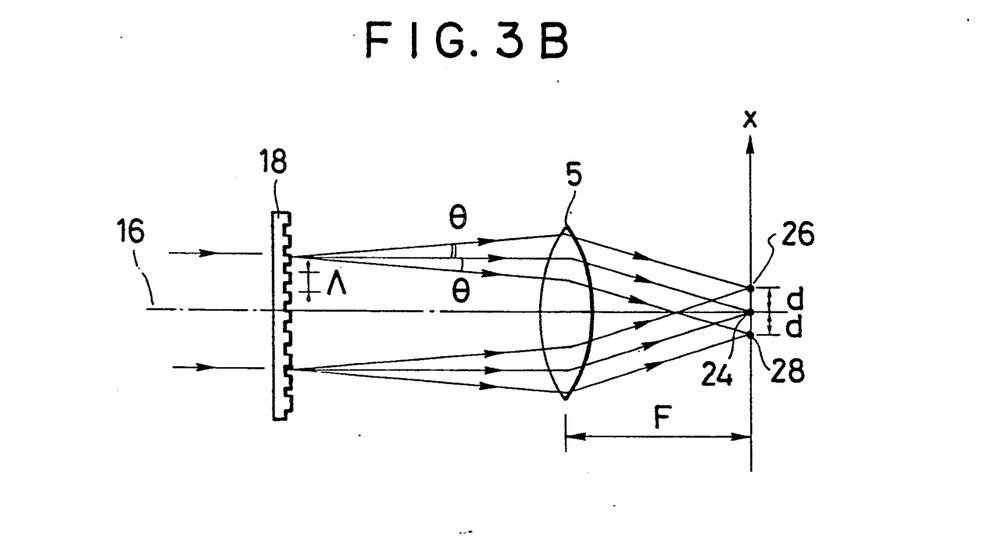

With reference to FIGS. 3A and 3B, the main scanning spot 24 and the satellite spots 26 and 28 are created by the well-known phenomenon of diffraction. The grating 18 has parallel grooves running in the y-direction. When a light beam incident on the grating 18 parallel to the optic axis 16 is transmitted through the grooves, wave interference causes the beam to emerge at a plurality of angles, thus becoming a plurality of beams deviating from each other in the x-direction. At least three of these beams are focused by the objective lens 22 onto the recording medium 2. The beam that emerges with zero angular deviation is focused onto the main scanning spot 24. First-order angular deviations of $\pm\theta$ give rise to beams that are focused onto the pair of satellite spots 26 and 28. The first-order deviation angle $\theta$ has the well-known formula:

$$\theta = \sin^{-1}(\lambda/\Lambda) \qquad (1)$$

$\Lambda$: groove spacing in grating 18
$\lambda$: wavelength of incident light
The distance d between the main scanning spot 24 and the satellite spots 26 and 28 is:

$$d = F\theta \qquad (2)$$

F: focal length of objective lens 22

Figure 4:
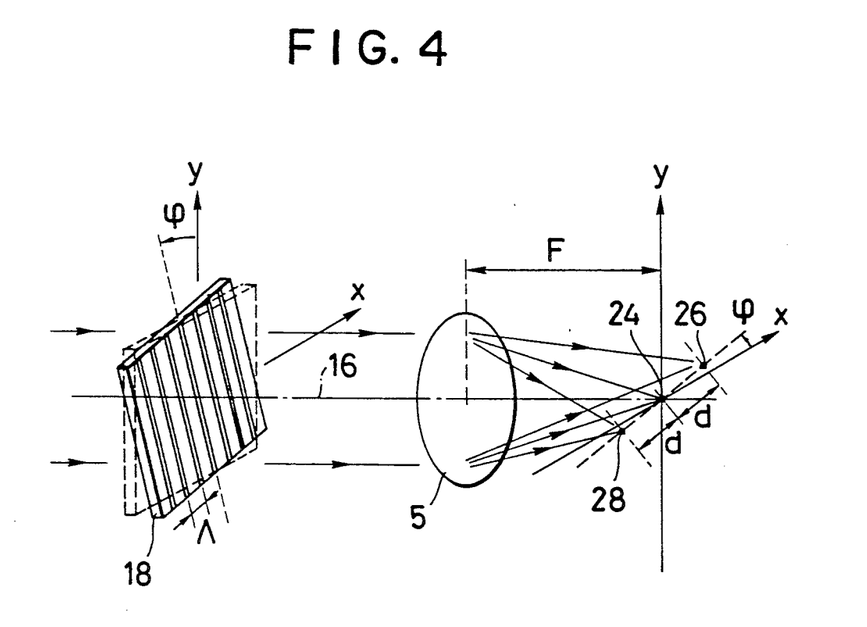
FIG. 4 illustrates wobbling of the satellite spots by rotation of a grating.
Figure 5:
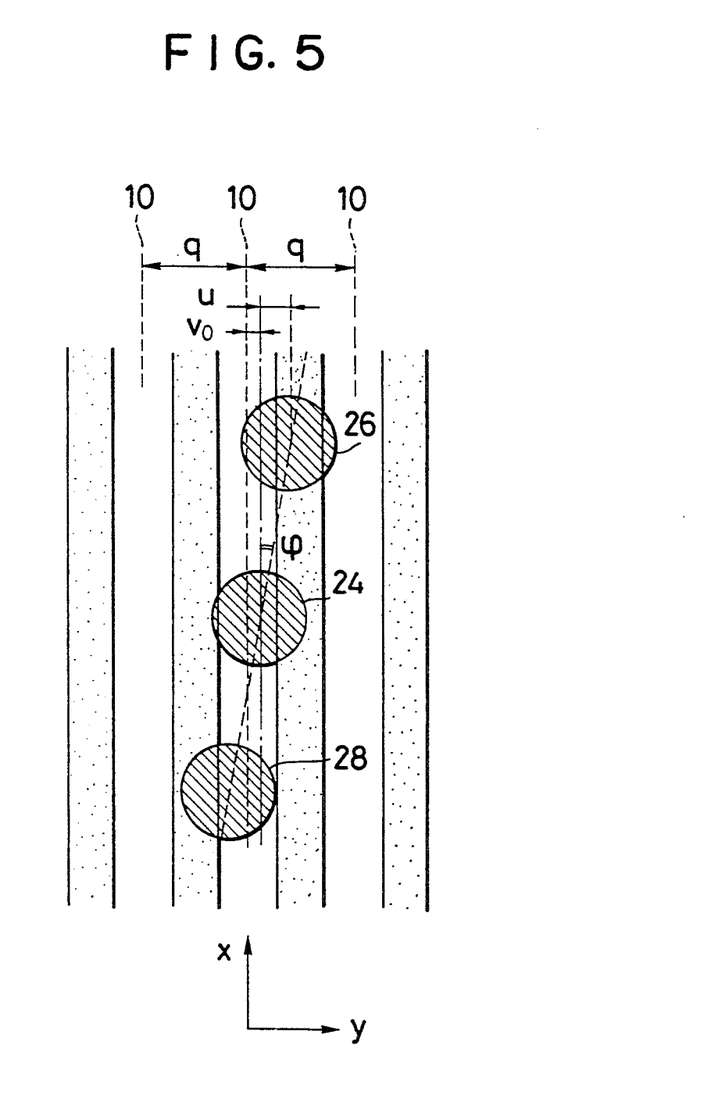
FIG. 5 illustrates the positions of the main scanning spot and satellite spots when the satellite spots are wobbled.

With reference to FIG. 4, when the grating 18 is rotated through an angle $\phi$ about the optic axis 16, due to the symmetry of the optical system, the satellite spots 26 and 28 also rotate by an angle $\phi$ around the main scanning spot 24. FIG. 5 shows the relative positions of the three spots when rotated by an angle $\phi$. In general the tracking will not be perfectly adjusted; there will be a distance $v_0$ between the center-line of the information track 10 and the line through the center of the main scanning spot 24. Due to the rotation, there is a further distance u from this latter line to the centers of the satellite spots 26 and 28. The distance u is related to the distance d between the satellite spots 26 and 28 and the main scanning spot 24 by the formula:

$$u = d \cdot \sin\phi = d\phi \text{(approximately)} \qquad (3)$$

The quantity u is the amplitude of wobble of the pair of satellite spots 26 and 28 with respect to the main scanning spot 24. The angle $\phi$ is proportional to the oscillating signal $C \cdot \sin(2\pi ft)$ that controls the rotary actuator 34 in FIG. 1. The wobble u is accordingly proportional to $d \cdot C \cdot \sin(2\pi ft)$, exhibiting simple harmonic motion with frequency f. Note that the wobbling of the satellite spots 26 and 28 does not affect the position or intensity of the main scanning spot 24, which remains steady.

Next a more detailed description will be given of the tracking control principle, using the signal notation in FIG. 2B.

Figure 6:
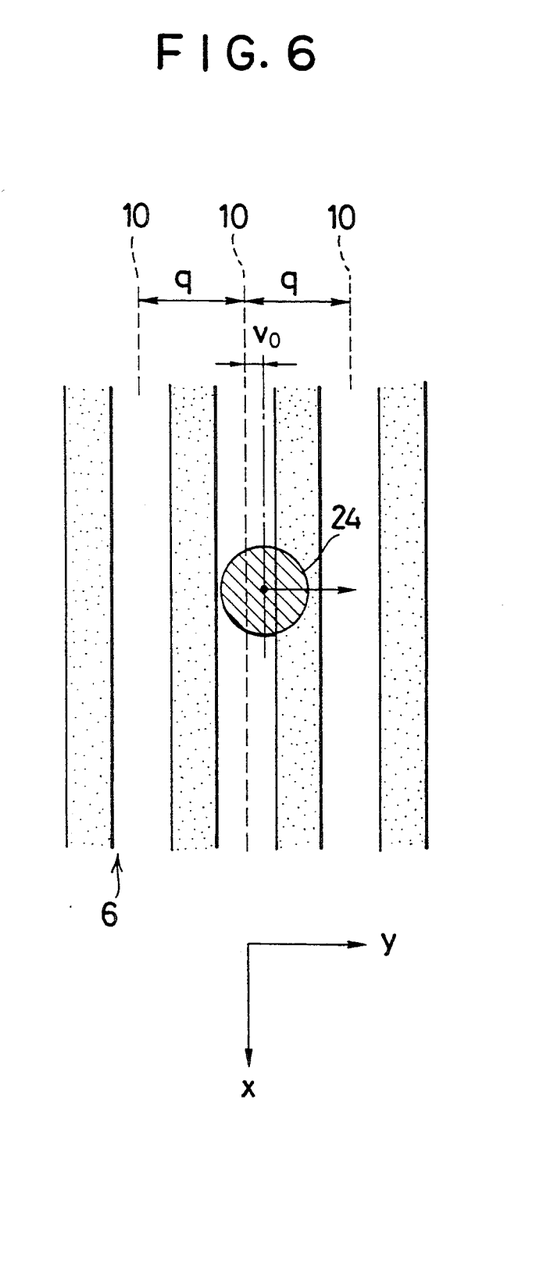
FIG. 6 illustrates parameters affecting the strength of signal obtained by detecting the reflected image of a spot.

With reference to FIG. 6, suppose that the main scanning spot 24, or in general any spot, is focused onto the recording medium 2 so that its center deviates by a distance $v_0$ from the center line of an information track 10. The light reflected from the recording medium 2 returns through the optical system to the photodetector array 38 in FIG. 2B and is converted to an electrical current $S(v_0)$ given by the formula $$S(v_0) = a + b \cdot \cos(2\pi v_0 / q) \qquad (4)$$

where q is the spacing of information tracks 10, and the parameters a and b are constants determined by such factors as the size and intensity of the spot, the reflectivity of the recording medium 2, and the shape of the track grooves in the recording medium 2.

Suppose next that the spot is moved in the direction of the arrow in FIG. 6 (the y-direction in FIG. 3A), according to the laws of simple harmonic motion with amplitude w and frequency f. Then $S(v_0)$ is given by:

$$S(v_0) = a + b \cdot \cos\{2\pi[v_0 + w \cdot \sin(2\pi ft)]/q\} \qquad (5)$$

If the amplitude w of the motion is sufficiently small in comparison to the track spacing q, equation (5) can be expanded as follows:

$$\begin{aligned} S(v_0) &= a + b \cdot \{\cos(2\pi v_0/q) \cdot \cos[(2\pi w/q) \cdot \sin(2\pi ft)] - \\ &\quad \sin(2\pi v_0/q) \cdot \sin[(2\pi w/q) \cdot \sin(2\pi ft)]\} \\ &= a + b \cdot \cos(2\pi v_0/q) - \\ &\quad b \cdot \sin(2\pi v_0/q) \cdot (2\pi w/q) \cdot \sin(2\pi ft) \end{aligned} \qquad (6)$$

Next consider the main scanning spot 24 and the pair of satellite spots 26 and 28 shown in FIG. 5. The centers of the pair of satellite spots 26 and 28 are displaced by $v_0 + u(t)$ and $v_0 - u(t)$, respectively, from the center of the information track 10. The output currents $s_1$ and $s_{-1}$ produced by detecting the reflected images of the satellite spots 26 and 28 are therefore given by the equations:

$$s_1 = a + b \cdot \cos[2\pi(v_0 + u)/q] \qquad (7)$$

$$s_{-1} = a + b \cdot \cos[2\pi(v_0 - u)/q] \qquad (8)$$

If the satellite spots 26 and 28 wobble in the y-direction in simple harmonic motion with amplitude w and frequency f, then u can be written as:

$$u = w \cdot \sin(2\pi ft) \qquad (9)$$

When equation (9) is substituted into equations (7) and (8), if the amplitude w is sufficiently small in relation to the track spacing q, the same expansion as applied to equation (6) gives:

$$\begin{aligned} s_1 &= a + b \cdot \cos\{(2\pi/q)[v_0 + w \cdot \sin(2\pi ft)]\} \\ &= a + b \cdot \{\cos(2\pi v_0/q) \cdot \cos[(2\pi w/q) \cdot \sin(2\pi ft)] - \\ &\quad \sin(2\pi v_0/q) \cdot \sin[(2\pi w/q) \cdot \sin(2\pi ft)]\} \\ &= a + b \cdot \cos(2\pi v_0/q) - \\ &\quad b(2\pi w/q) \cdot \sin(2\pi v_0/q) \cdot \sin(2\pi ft) \end{aligned} \qquad (10)$$

$$\begin{aligned} s_{-1} &= a + b \cdot \cos\{(2\pi/q)[v_0 - w \cdot \sin(2\pi ft)]\} \\ &= a + b \cdot \{\cos(2\pi v_0/q) \cdot \cos[(2\pi w/q) \cdot \sin(2\pi ft)] + \\ &\quad \sin(2\pi v_0/q) \cdot \sin[(2\pi w/q) \cdot \sin(2\pi ft)]\} \\ &= a + b \cdot \cos(2\pi v_0/q) + \\ &\quad b(2\pi w/q) \cdot \sin(2\pi v_0/q) \cdot \sin(2\pi ft) \end{aligned} \qquad (11)$$

When the output currents $s_1$ and $s_{-1}$ are multiplied by the oscillating signal $C \cdot \sin(2\pi ft)$ used to wobble the pair of satellite spots 26 and 28, the product signals $s'_1$ and $s'_{-1}$ are:

$$\begin{aligned} s'_1 &= s_1 \cdot C \cdot \sin(2\pi ft) \\ &= [a + b \cdot \cos(2\pi v_0/q)]C \cdot \sin(2\pi ft) - \\ &\quad bC \cdot (2\pi w/q) \sin(2\pi v_0/q) \cdot \sin^2(2\pi ft) \\ &= [a + b \cdot \cos(2\pi v_0/q)]C \cdot \sin(2\pi ft) - \\ &\quad bC \cdot (2\pi w/q) \cdot \sin(2\pi v_0/q) \cdot (\tfrac{1}{2})[1 - \cos(4\pi ft)] \end{aligned} \qquad (12)$$

$$\begin{aligned} s'_{-1} &= s_{-1} \cdot C \cdot \sin(2\pi ft) \\ &= [a + b \cdot \cos(2\pi v_0/q)]C \cdot \sin(2\pi ft) + \\ &\quad bC \cdot (2\pi w/q) \cdot \sin(2\pi v_0/q) \cdot (\tfrac{1}{2})[1 - \cos(4\pi ft)] \end{aligned} \qquad (13)$$

Low-pass filtering of $s'_1$ and $s'_{-1}$ removes frequency components of f and higher, thus removing such terms as $\sin(2\pi ft)$ and $\cos(4\pi ft)$, leaving the signals:

$$s''_1 = -(bC/2)(2\pi w/q) \cdot \sin(2\pi v_0/q) \qquad (14)$$

$$s''_{-1} = (bC/2)(2\pi w/q) \cdot \sin(2\pi v_0/q) \qquad (15)$$

Finally, $s''_{-1}$ is subtracted from $s''_1$ to obtain the tracking error signal TE.

$$\begin{aligned} TE &= s''_1 - s''_{-1} \\ &= -bC(2\pi w/q) \cdot \sin(2\pi v_0/q) \end{aligned} \qquad (16)$$

From equation (16) it can readily be seen that:
(1) TE is an odd function of the tracking deviation $v_0$, with opposite sign.
(2) TE is proportional to the wobbling amplitude w and to the amplitude C of the oscillating signal.

The tracking actuator 64 in FIG. 1 is adapted to move the objective lens 22 in the positive y-direction when TE is positive, and in the negative y-direction when TE is negative. Since TE is opposite in sign to the tracking deviation $v_0$, the tracking actuator 64 acts to reduce $v_0$ to zero, thus keeping the main scanning spot 24 accurately centered on the information track 10.

This tracking control scheme is highly immune to offset introduced by the tilt of the recording medium 2 or the track-following motion of the objective lens 22. Moreover, as noted in FIGS. 4 and 5, it wobbles only the pair of satellite spots 26 and 28, leaving the main scanning spot 24 steady, which is particularly advantageous when the main scanning spot 24 is used for writing information.

Next several modifications of the optical read/write apparatus in FIG. 1 will be described.

Figure 7:
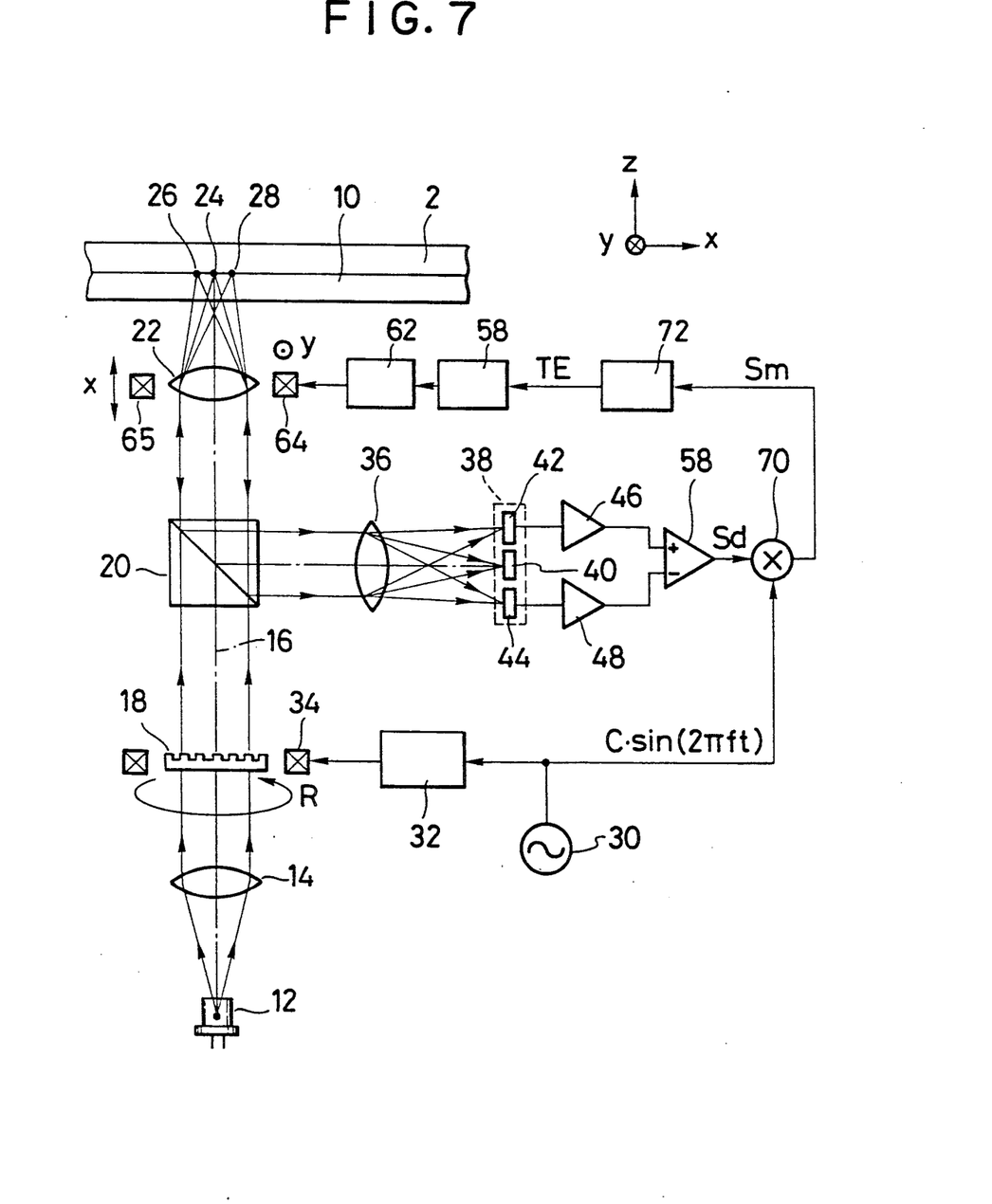
FIG. 7 illustrates a modification of the tracking control system in FIG. 1.

FIG. 7 illustrates the first of these modifications. The outputs of the pair of current-to-voltage converters 46 and 48 are input directly to the differential amplifier 58. The difference signal Sd output by the differential amplifier 58 is multiplied by the oscillating signal C·sin(2π ft) from the oscillator 30 in a multiplier 70, producing a single product signal Sm. The product signal Sm is passed through a single low-pass filter 72 having a cut-off frequency less than the frequency f of the oscillator 30, the filtered signal becoming the tracking error signal TE.

The operation of the optical read/write apparatus in FIG. 7 can be described mathematically as follows. Let $s_1$ and $s_{-1}$ be the output currents from the photodetector 42 and the photodetector 44, as given by equations (10) and (11). Omitting the current-to-voltage conversion coefficients for simplicity, the output Sd of the differential amplifier 58 is:

$$Sd = s_1 - s_{-1} \quad (17)$$
$$= -2b(2\pi w/q) \cdot \sin(2\pi v_0/q) \cdot \sin(2\pi ft)$$

The product signal Sm is:

$$Sm = Sd \cdot C \cdot \sin(2\pi ft) \quad (18)$$
$$= -2bC(2\pi w/q) \cdot \sin(2\pi v_0/q) \cdot \sin^2(2\pi ft)$$
$$= -2bC(2\pi w/q) \cdot \sin(2\pi v_0/q) \cdot (\tfrac{1}{2})[1 - \cos(4\pi ft)]$$

Low-pass filtering in the low-pass filter 72 removes the cos(4π ft) component, leaving:

$$TE = -bC(2\pi w/q) \cdot \sin(2\pi v_0/q) \quad (19)$$

Equation (19) is identical to equation (16). The tracking control circuit in FIG. 7 gives the same tracking control as the circuit in FIG. 1, with the advantage of requiring only one multiplier and one low-pass filter.

Figure 8:
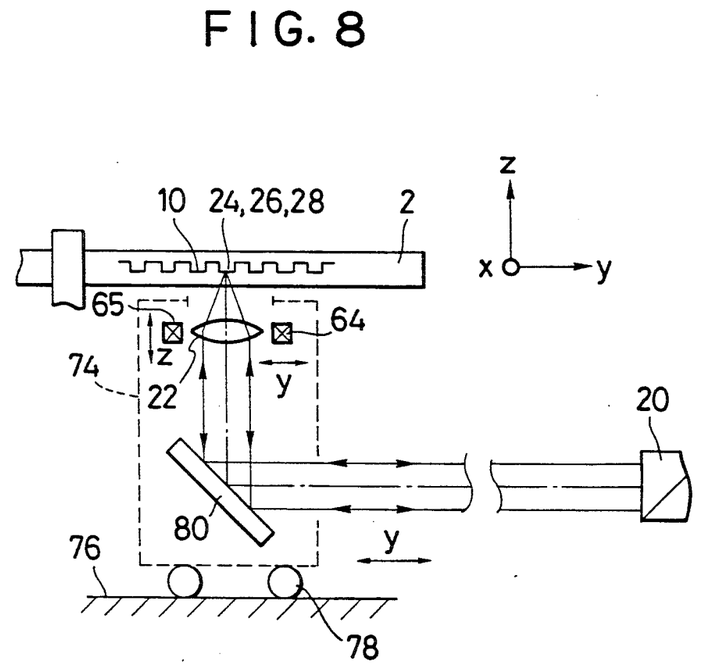
FIG. 8 illustrates the mounting of the objective lens and tracking actuator in a movable carriage.

The extremely small track offsets obtained with the tracking control circuits in FIG. 1 and FIG. 7 enable tracking to be controlled accurately even if the entire optical system is not integrated into a single physical unit. With reference to FIG. 8, the objective lens 22, the tracking actuator 64, and the focusing actuator 65 can be mounted in a carriage 74 resting on a base 76, with rotary bearings 78 disposed between the carriage 74 and the base 76 permitting the carriage 74 to move in the y-direction, at right angles to the tracks. The rest of the optical and control system shown in FIG. 1 or 7 is mounted in a fixed position, only the beam splitter 20 being shown in FIG. 8. A mirror 80 mounted in the carriage 74 at an angle of substantially 45° to the beams from the beam splitter 20 redirects these beams toward the objective lens 22. A main scanning spot 24 and pair of satellite spots 26 and 28 are formed on the recording medium 2 in the same way as before. The light reflected from the recording medium 2 returns by the same path to the beam splitter 20, and tracking control is carried out as in FIG. 1 or 7.

An advantage of the arrangement shown in FIG. 8 is that the relatively small mass of the carriage 74 permits it to be moved rapidly from track to track, shortening the track seeking time.

Figure 9:
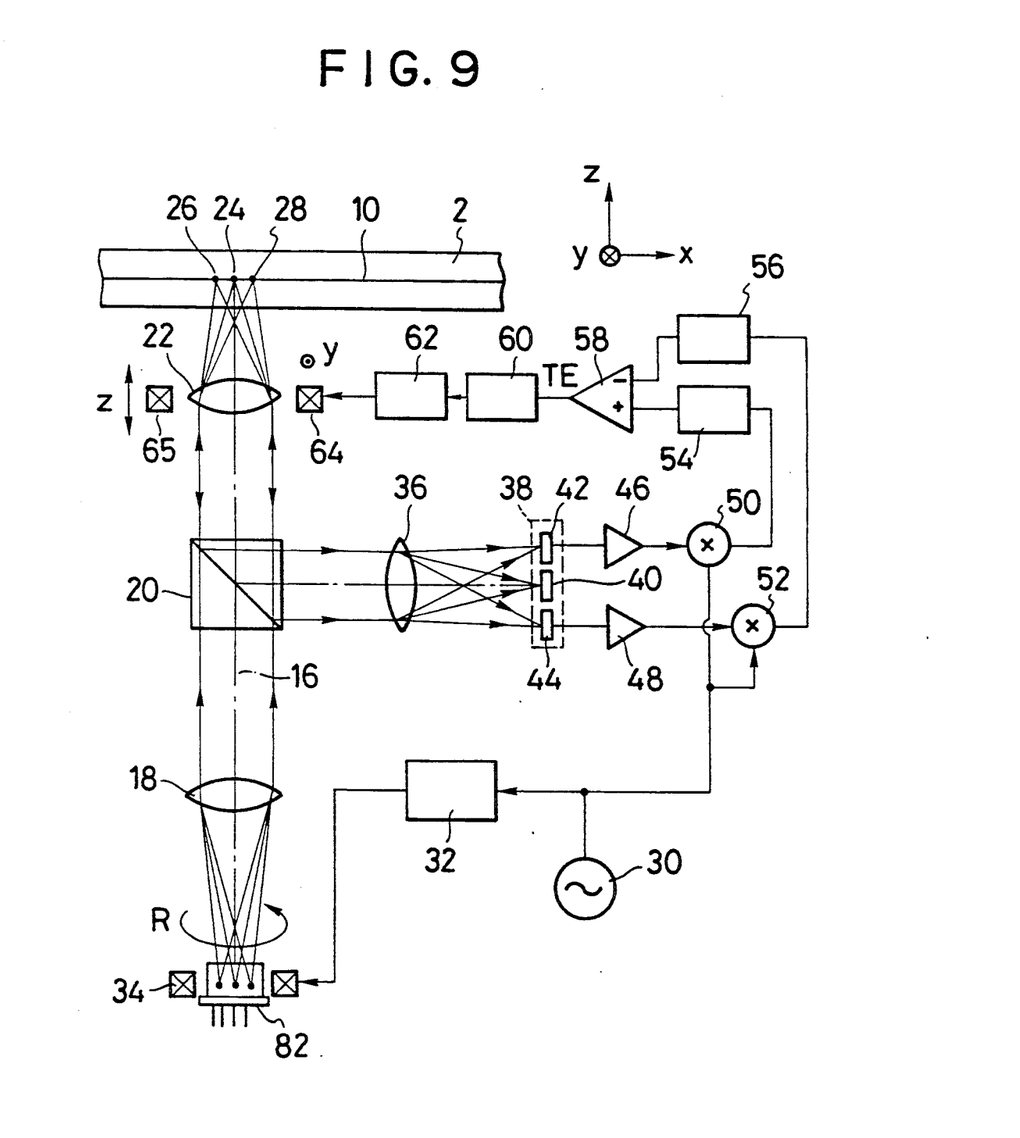
FIG. 9 illustrates a modification of the optical system in FIG. 1.

The means of generating and wobbling the satellite spots need not be the rotatable grating shown in FIGS. 1 and 7. With reference to FIG. 9, the spots can be created by a laser array 82 having three emitting points, the central emitting point producing the main scanning spot 24 and the two outer emitting points producing the satellite spots 26 and 28. To wobble the pair of satellite spots 26 and 28, the rotary actuator 34 rotates the laser array 82 as indicated by the arrow R. Other components in FIG. 9 are the same as in FIG. 1.

Figure 10:
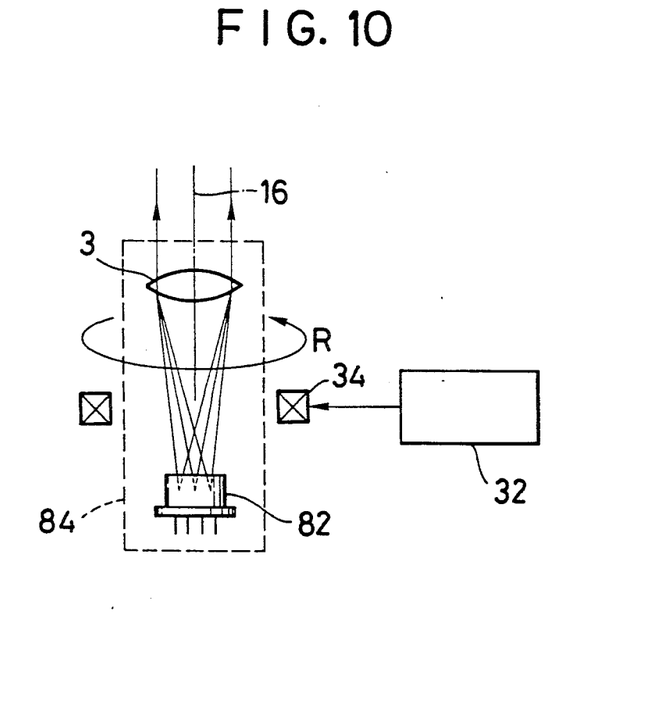
FIG. 10 illustrates an alternative scheme for wobbling the satellite spots in FIG. 9.

With reference to FIG. 10, the laser array 82 and the collimating lens 14 may be united into a single collimated light source 84, which is rotated as a whole by the rotary actuator 34.

Figure 11:
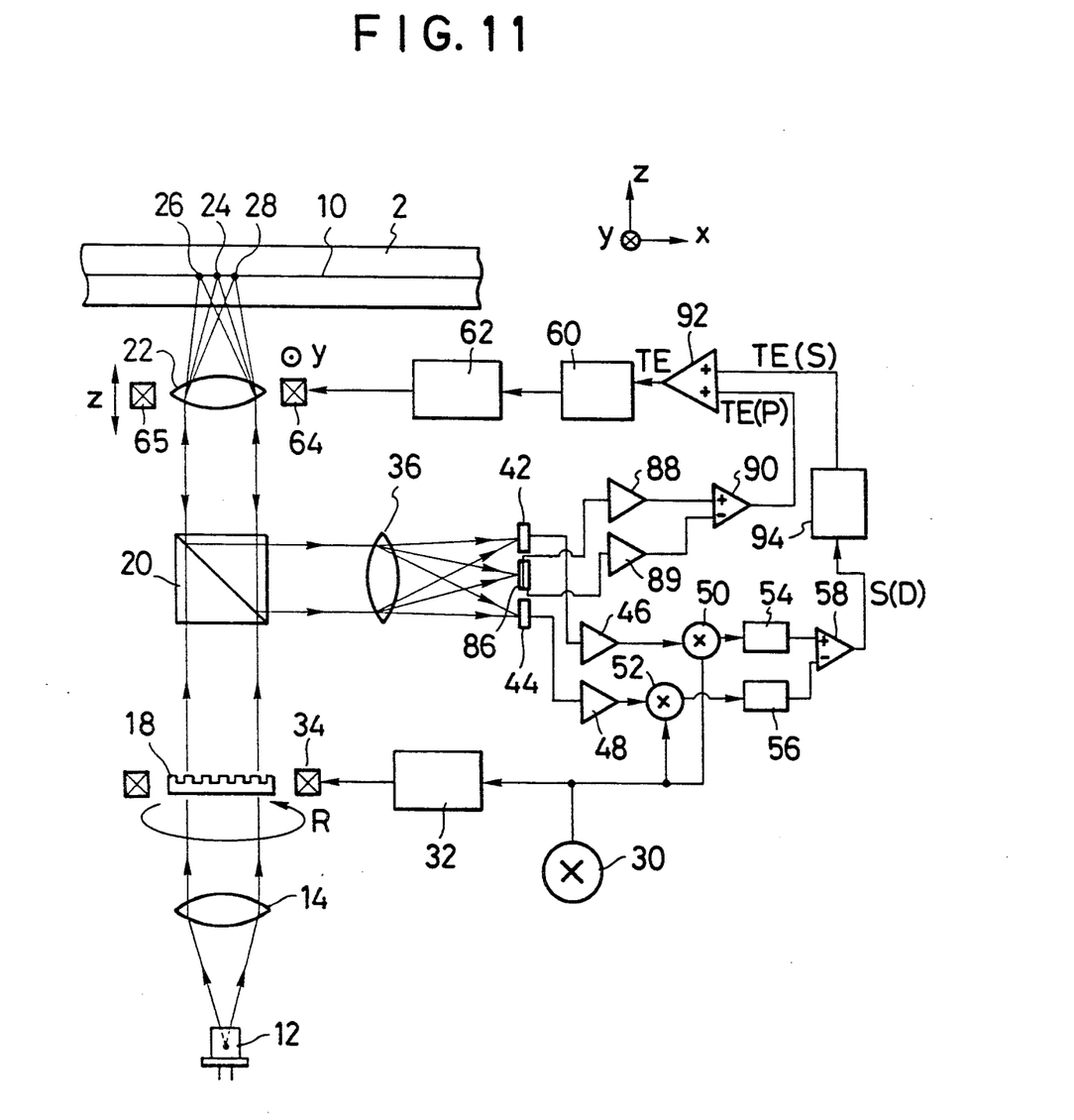
FIG. 11 illustrates another modification of the tracking control system in FIG. 1.

With reference to FIG. 11, the tracking control system can be modified so as to employ the wobbling method for low-frequency control and the push-pull method for high-frequency control. Reference numerals in FIG. 11 identical to numerals in FIG. 1 denote identical or equivalent elements, detailed descriptions of which will be omitted.

The light reflected from the main scanning spot 24 in FIG. 11 is detected by a split photodetector 86 and converted by a pair of current-to-voltage converters 88 and 89 to a pair of voltage signals that are input to a differential amplifier 90. The output of the differential amplifier 90 is a push-pull tracking error signal TE(P) which is coupled to one input of a summing amplifier 92.

The light reflected from the pair of satellite spots 26 and 28 in FIG. 11 is detected and processed in the same way as in FIG. 1 as far as the differential amplifier 58, the output of the differential amplifier 58 being referred to as a satellite difference signal S(D). The satellite difference signal S(D) is fed to a low-pass filter 94 with a cutoff frequency which is substantially equal to or higher than the rate of rotation of the recording medium 2 and is lower than the wobbling frequency f. The output of the low-pass filter 94 is a satellite tracking error signal TE(S) that is applied to the other input of the summing amplifier 92. The sum of the inputs to the summing amplifier 92 is a combined tracking error signal TE that is input to the phase compensator 60 and controls the tracking actuator 64.

Figure 12:
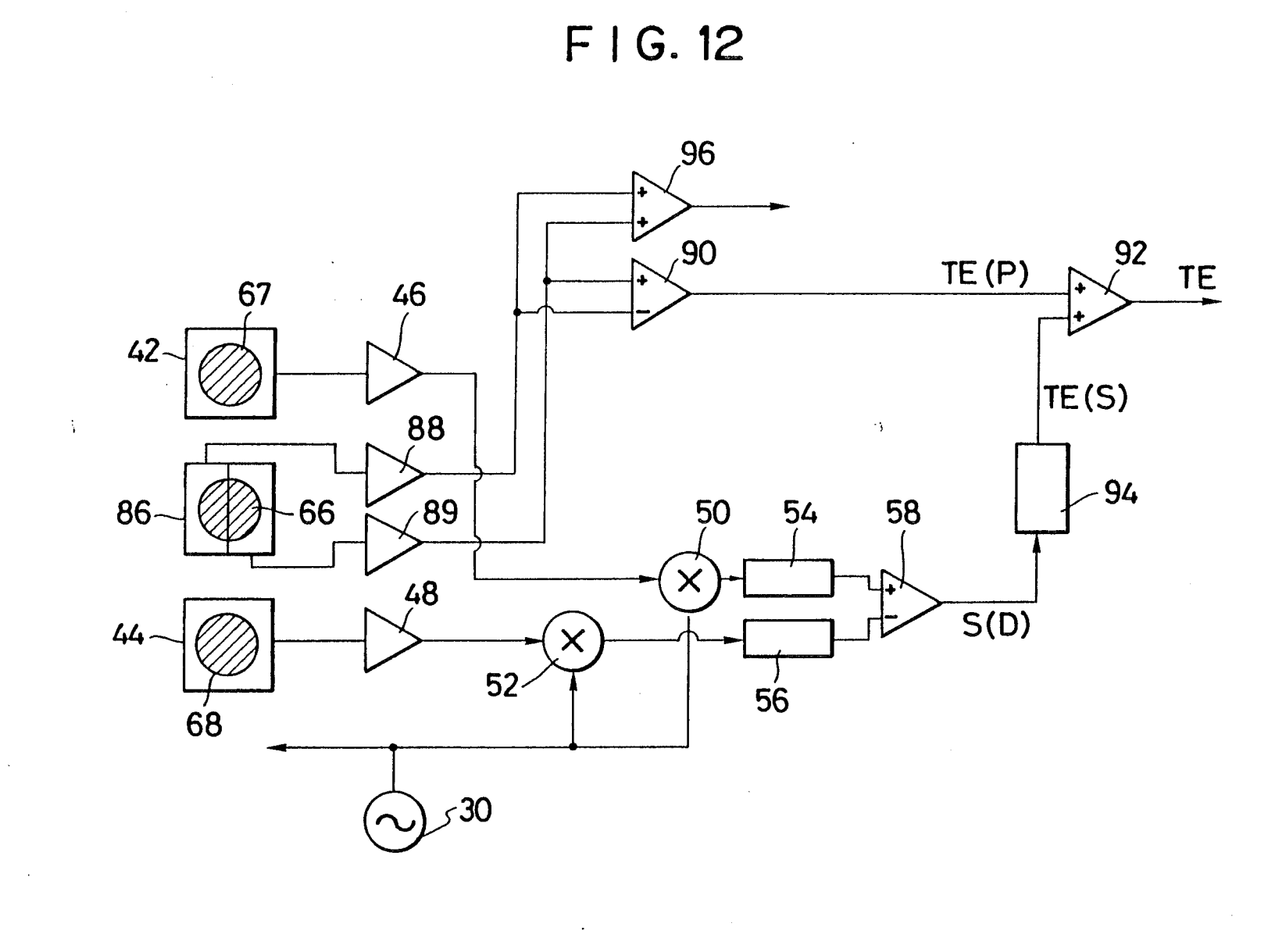
FIG. 12 is a more detailed drawing of the modified tracking control system in FIG. 11.

The circuits for generating the tracking error signals TE(S), TE(P), and TE are shown more clearly in FIG. 12. When the main scanning spot is centered on a track, its spot image 66 falls equally on the two halves of the split photodetector 86, so the outputs of the two current-to-voltage converters 88 and 89 are equal and their difference TE(P) is zero. If the main scanning spot moves away from the center of the track, TE(P) will take on a corresponding positive or negative value. Thus TE(P) is, like TE(S), an odd function of the tracking deviation.

The outputs from the two current-to-voltage converters 88 and 89 are also input to a summing amplifier 96, the output of which is an information signal containing information read from the track.

In the frequency region from dc up to the rate of rotation of the recording medium 2 (30 to 60 Hz for example), the combined tracking error signal TE is dominated by TE(S), so low-frequency tracking control is carried out mainly by the spot-wobbling method. The effects of tilt or eccentricity of the recording medium 2 and track-following motion of the objective lens 22 appear mainly in this frequency region, so they do not cause appreciable track offset. In the higher frequency region, extending into the kilohertz range, TE is dominated by TE(P), so high-frequency tracking control is carried out mainly by the push-pull method. This combination of the spot-wobbling and push-pull methods provides a tracking control system that is accurate and effective over a very wide frequency range, even though the wobbling frequency f cannot be set sufficiently higher than the cutoff frequency (normally a few kHz) of the tracking servo loop.

The scope of this invention is not limited to the structures shown in the drawings but includes further modifications and variations which will be apparent to one skilled in the art. For example, the tracking control circuit shown in FIG. 7 can be combined with the optical means shown in FIG. 9 or FIG. 10, or with the push-pull circuit shown in FIGS. 11 and 12. The optical means shown in FIG. 9 or FIG. 10 can likewise be combined with FIGS. 11 and 12.

What is claimed is:

1. An optical read/write apparatus for reading and writing information on information tracks on a recording medium, comprising:
   optical means for directing a main scanning spot and a pair of satellite spots, one on either side of said main scanning spot, on said recording medium, said main scanning spot and satellite spots being disposed on a line substantially parallel to said information tracks,
   said optical means including,
      a light-emitting source for emitting a light beam,
      a collimator lens for collimating said light beam,
      a grating for diffracting the collimated light beam, thus generating a plurality of beams, and
      an objective lens for focusing at least three of said plurality of beams onto said recording medium to form said main scanning spot and said satellite scanning spots;
   wobbling means for moving said satellite spots in relation to said main scanning spot, causing said satellite spots to wobble in a direction perpendicular to said information tracks, said wobbling means including,
      an oscillator for generating an oscillating signal with a frequency f, f being an integer, and a rotary actuator for rotating said grating according to said oscillating signal; and
   tracking control means, including a tracking actuator, for detecting light reflected from said satellite spots, generating therefrom a tracking error signal, and moving said objective lens with the track actuator, according to said tracking error signal, thereby moving the main scanning spot in a direction perpendicular to said information tracks.

2. The apparatus of claim 1, wherein said wobbling means further comprises an amplifier, electrically coupled to said oscillator and said rotary actuator, for amplifying said oscillating signal and supplying the amplified oscillating signal to said rotary actuator.

3. The apparatus of claim 1, wherein said grating is rotatably mounted in a plane perpendicular to said collimated light beam, and is rotated in said plane by said rotary actuator.

4. The apparatus of claim 1, wherein said tracking control means further comprises:
   a phase compensator for receiving and correcting the phase of said tracking error signal; and
   an amplifier, electrically coupled to said phase compensator and said tracking actuator, for amplifying the phase-corrected tracking error signal and providing the amplified signal to said tracking actuator.

5. The apparatus of claim 1, wherein said objective lens and said tracking actuator are mounted on a movable carriage and said light-emitting source, said collimator lens, and said grating are mounted in a fixed position.

6. An optical read/write apparatus for reading and writing information on information tracks on a recording medium, comprising:
   optical means for directing a main scanning spot and a pair of satellite spots, one on either side of said main scanning spot, onto said recording medium, said main scanning spot and satellite spots being disposed on a line substantially parallel to said information tracks
   said optical means including,
      a laser array for emitting three light beams,
      a collimator lens for collimating said light beams, and
      an objective lens for focusing said light beams onto said recording medium;
   wobbling means for moving said satellite spots in relation to said main scanning spot, causing said satellite spots to wobble in a direction perpendicular to said information tracks, said wobbling means including,
      an oscillator for generating an oscillating signal with a frequency f, f being an integer, and a rotary actuator for rotating at least part of said optical means according to said oscillating signal; and
   tracking control means for detecting light reflected from said satellite spots, generating therefrom a tracking error signal, and moving said main scanning spot according to said tracking error signal in a direction perpendicular to said information tracks.

7. The apparatus of claim 6, wherein said laser array is rotated by said rotary actuator.

8. The apparatus of claim 6, wherein said laser array and said collimator lens are rotated by said rotary actuator.

9. The apparatus of claim 6, wherein said tracking control means comprises a tracking actuator for moving said objective lens according to said tracking error signal.

10. The apparatus of claim 9, wherein said tracking control means further comprises:
    a phase compensator for receiving and correcting the phase of said tracking error signal; and
    an amplifier, electrically coupled to said phase compensator and said tracking actuator, for amplifying the phase-corrected tracking error signal and providing the amplified signal to said tracking actuator.

11. The apparatus of claim 9, wherein said objective lens and said tracking actuator are mounted on a movable carriage and said laser array and said collimator lens are mounted in a fixed position.

12. An optical read/write apparatus for reading and writing information on information tracks on a recording medium, comprising:
    optical means for directing a main scanning spot and a pair of satellite spots, one on either side of said main scanning spot, onto said recording medium, said main scanning spot and satellite spots being disposed on a line substantially parallel to said information tracks;

wobbling means for moving said satellite spots in relation to said main scanning spot, causing said satellite spots to wobble in a direction perpendicular to said information tracks, said wobbling means including an oscillator for generating an oscillating signal with a frequency f, f being an integer, and a rotary actuator for rotating at least part of said optical means according to said oscillating signal; and tracking control means for detecting light reflected from said satellite spots, generating therefrom a tracking error signal, and moving said main scanning spot according to said tracking error signal in a direction perpendicular to said information tracks, said tracking control means including, a pair of photodetectors for detecting light reflected from said pair of satellite spots, a pair of multipliers for multiplying signals output from said pair of photodetectors by said oscillating signal, thus generating a pair of product signals, a pair of low-pass filters for filtering said pair of product signals, and a differential amplifier for receiving outputs of said pair of low-pass filters and taking their difference, thus generating said tracking error signal.

13. The apparatus of claim 12, wherein said low-pass filters have a cutoff frequency less than said frequency f.

14. An optical read/write apparatus for reading and writing information on information tracks on a recording medium, comprising:

optical means for directing a main scanning spot and a pair of satellite spots, one on either side of said main scanning spot, onto said recording medium, said main scanning spot and satellite spots being disposed on a line substantially parallel to said information tracks;

wobbling means for moving said satellite spots in relation to said main scanning spot, causing said satellite spots to wobble in a direction perpendicular to said information tracks, said wobbling means including an oscillator for generating an oscillating signal with a frequency f, f being an integer, and a rotary actuator for rotating at least part of said optical means according to said oscillating signal; and tracking control means for detecting light reflected from said satellite spots, generating therefrom a tracking error signal, and moving said main scanning spot according to said tracking error signal in a direction perpendicular to said information tracks, said tracking control means including, a pair of photodetectors for detecting light reflected from said pair of satellite spots, a differential amplifier for receiving outputs of said pair of photodetectors and taking their difference, thus generating a difference signal, a multiplier for multiplying said difference signal by said oscillating signal, thus generating a product signal, and a low-pass filter for filtering said product signal, thus generating said tracking error signal.

15. The apparatus of claim 14, wherein said low-pass filter has a cutoff frequency less than said frequency f.

16. An optical read/write apparatus for reading and writing information on information tracks on a recording medium, comprising:

optical means for directing a main scanning spot and a pair of satellite spots, one on either side of said main scanning spot, on said recording medium, said main scanning spot and satellite spots being disposed on a line substantially parallel to said information tracks;

wobbling means for moving said satellite spots in relation to said main scanning spot, causing said satellite spots to wobble in a direction perpendicular to said information tracks, said wobbling means including an oscillator for generating an oscillating signal with a frequency f, f being an integer, and a rotary actuator for rotating at least part of said optical means according to said oscillating signal; and tracking control means for detecting light reflected from said satellite spots, generating therefrom a tracking error signal, and moving said main scanning spot according to said tracking error signal in a direction perpendicular to said information tracks, said tracking control means including, a pair of photodetectors for detecting light reflected from said pair of satellite spots, a pair of multipliers for multiplying signals output from said pair of photodetectors by said oscillating signal, thus generating a pair of product signals, a pair of low-pass filters for filtering said pair of product signals, a differential amplifier for receiving said pair of product signals and taking their difference, thus generating a satellite difference signal, a low-pass filter for filtering said satellite difference signal, thus generating a satellite tracking error signal, a split photodetector for detecting light reflected from said main scanning spot and generating a pair of signals, a differential amplifier for taking the difference of the pair of signals output by said split photodetector, thus generating a push-pull tracking error signal, and a summing amplifier for adding said satellite tracking error signal and said push-pull tracking error signal, thus generating said tracking error signal.

17. The apparatus of claim 16, wherein said pair of low-pass filters for filtering said pair of product signals have a cutoff frequency less than said frequency f.

18. The apparatus of claim 16, wherein said low-pass filter for filtering said satellite difference signal has a cutoff frequency which is substantially equal to or higher than a rotational rate of said recording medium and is lower than said frequency f.

* * * * *